United States Patent
Lin (10) Patent No.: US 8,104,978 B2
(45) Date of Patent: Jan. 31, 2012

(54) OPTICAL FIBER MECHANICAL WEDGE SPLICE

(76) Inventor: Parry Lin, Hsinchu (TW)

( * ) Notice: Subject to any disclaimer, the term of this patent is extended or adjusted under 35 U.S.C. 154(b) by 0 days.

(21) Appl. No.: 12/641,880

(22) Filed: Dec. 18, 2009

(65) Prior Publication Data

US 2010/0183263 A1    Jul. 22, 2010

(30) Foreign Application Priority Data

Jan. 20, 2009    (TW) .............................. 98102132 A (51) Int. Cl.
*G02B 6/38*    (2006.01)
(52) U.S. Cl. ............................................ 385/95; 385/98
(58) Field of Classification Search ........................ None
See application file for complete search history.

(56) References Cited

U.S. PATENT DOCUMENTS

| 4,045,121 A * | 8/1977 | Clark ............................... 385/58 |
| 4,730,892 A | 3/1988 | Anderson et al. |
| 5,042,902 A | 8/1991 | Huebscher et al. |
| 5,220,630 A | 6/1993 | DeVeau, Jr. et al. |
| 5,638,477 A | 6/1997 | Patterson et al. |
| 5,708,746 A | 1/1998 | Kim et al. |
| 5,963,699 A | 10/1999 | Tanaka et al. |
| 5,984,532 A * | 11/1999 | Tamaki et al. .................. 385/70 |
| 2005/0089278 A1 * | 4/2005 | Bradley et al. .................. 385/55 |

FOREIGN PATENT DOCUMENTS

JP    2-190803 A  *  7/1990

* cited by examiner

*Primary Examiner* — Mike Stahl
(74) *Attorney, Agent, or Firm* — Volpe and Koenig, P.C.

(57) ABSTRACT

A wedge-type mechanical optical fiber splice is provided in the present invention. The splice comprises a housing, a V-grooved block, a pushing block, and a first wedge. The housing is a hollow block, and has two openings for guiding optical fiber at two opposite sides. The V-grooved block, so called a first block, is a long strip block having a V-shaped groove on its surface. The pushing block, so called a second block, confronts to the V-grooved block. The first wedge is a wedged-type block. The second block is moved toward the first block or the first block is moved toward the second block by pushing down the first wedge, so that two optical fibers are aligned and secured in the V groove.

6 Claims, 9 Drawing Sheets

OPTICAL FIBER MECHANICAL WEDGE SPLICE

FIELD OF THE INVENTION

The present invention relates to a wedge type mechanical splice. In particular, the present invention relates to an optical fiber splice which aligns and fastens two optical fibers in a V-grooved block by the wedge, so as to achieve the effects such as high tensile strength and easy alignment, etc.

BACKGROUND OF THE INVENTION

Figure 1:
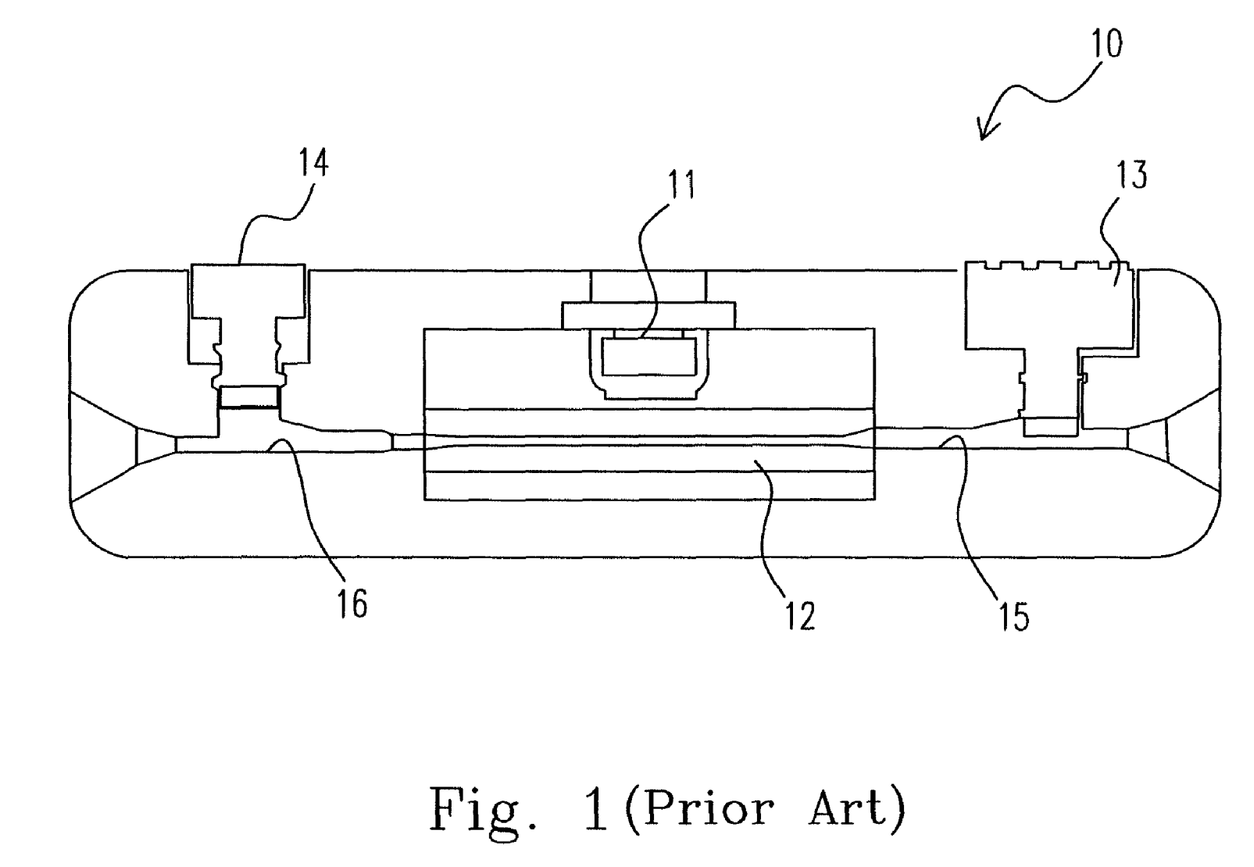
FIG. 1 is a schematic diagram showing the fastening of an optical fiber mechanical splice in the prior art (U.S. Pat. No. 4,730,892).

The regular mechanical optical fiber splice is used in the connection of two optical fibers to maintain optical signal transmission. The mechanical optical fiber splice includes two parts, the fiber fastening section and the jacket (or named as "buffer") fastening section. Please refer to FIG. 1, which is the diagram in U.S. Pat. No. 4,730,892 entitled "OPTICAL FIBER MECHANICAL SPLICE". In FIG. 1, a splice device 10 is shown, in which an adjustment screw 11 is configured to fasten the fiber fastening section 12, and two stud clamps 13, 14 to fasten the jacket fastening sections (i.e. V-grooves) 15, 16, respectively. Since a screw driver and stirring by hand is needed, the splice device 10 might be less convenient for use.

Figure 2:
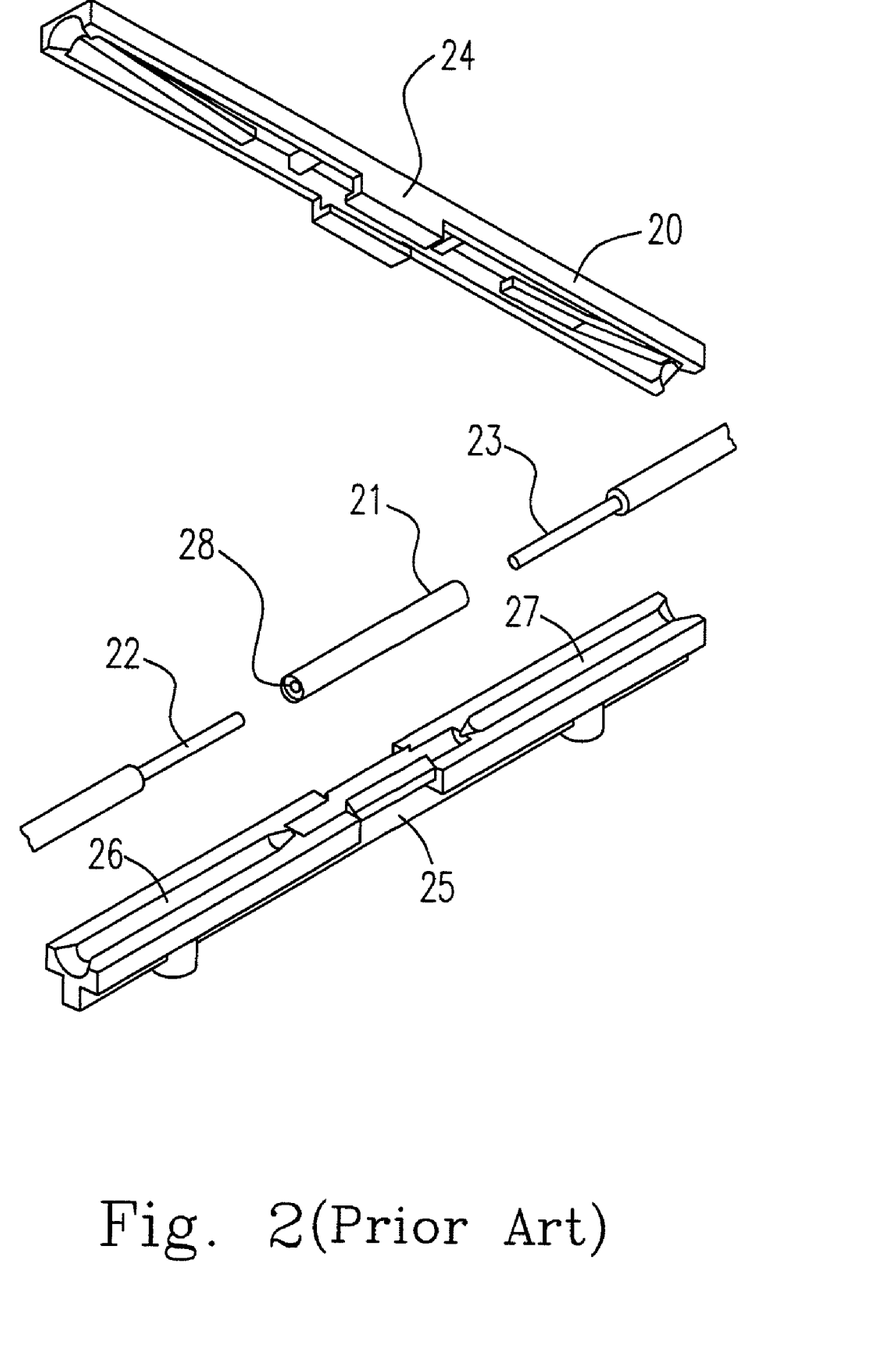
FIG. 2 is a three dimensional view showing components of another optical fiber mechanical splice in the prior art (U.S. Pat. No. 5,040,902).
Figure 3:
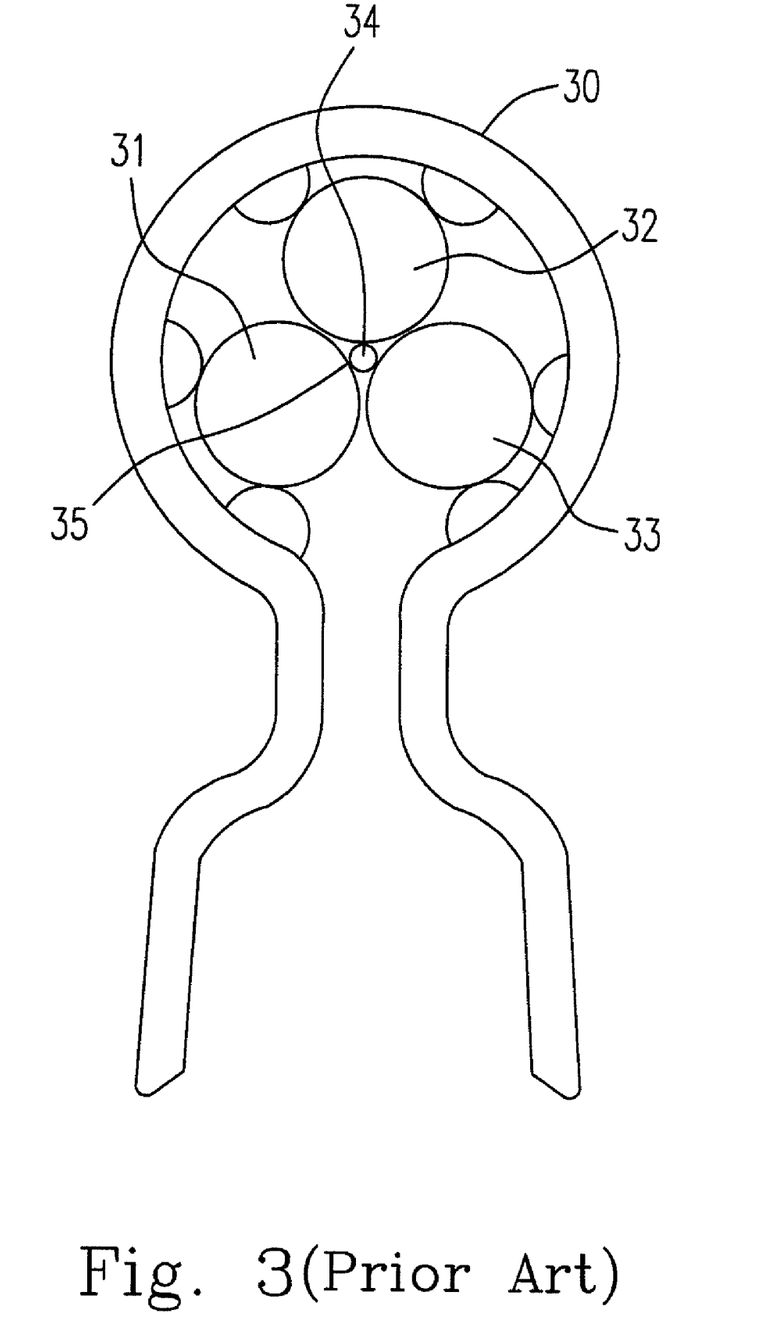
FIG. 3 is a cross-sectional view showing the fastening of another optical fiber mechanical splice in the prior art (U.S. Pat. No. 5,220,630).

Please refer to FIG. 2, which is the diagram in U.S. Pat. No. 5,042,902 entitled "OPTICAL FIBER SPLICE AND METHOD OF USE". In FIG. 2, a splice device 20 is shown, which utilizes a capillary tube 21 to receive two optical fibers 22, 23. Further, two jacket fastening sections 26, 27 are formed after an upper section 24 and a lower section 25 are assembled together. Since a relatively large space exists within the passageway 28 and the optical fibers 22, 23, the optical fibers 22, 23 are not fastened directly. Therefore, it exists the drawback of insufficient stability. Please refer to FIG. 3, which is the diagram in U.S. Pat. No. 5,220,630 entitled "OPTICAL FIBER THREE-ROD CONNECTOR HAVING A ROD-SECURING CLIP". In FIG. 3, an elastic fastening clip 30 is shown, which utilizes three slender cylindrical rods 31, 32, 33 to fasten the optical fiber 34. Further, the optical fiber fastening section 35 is inherently obtained by the space formed within three rods 31, 32, 33. Since only the optical fiber 34, rather than the jacket 34, is fastened, the stability of such a structure might still be insufficient.

Figure 4:
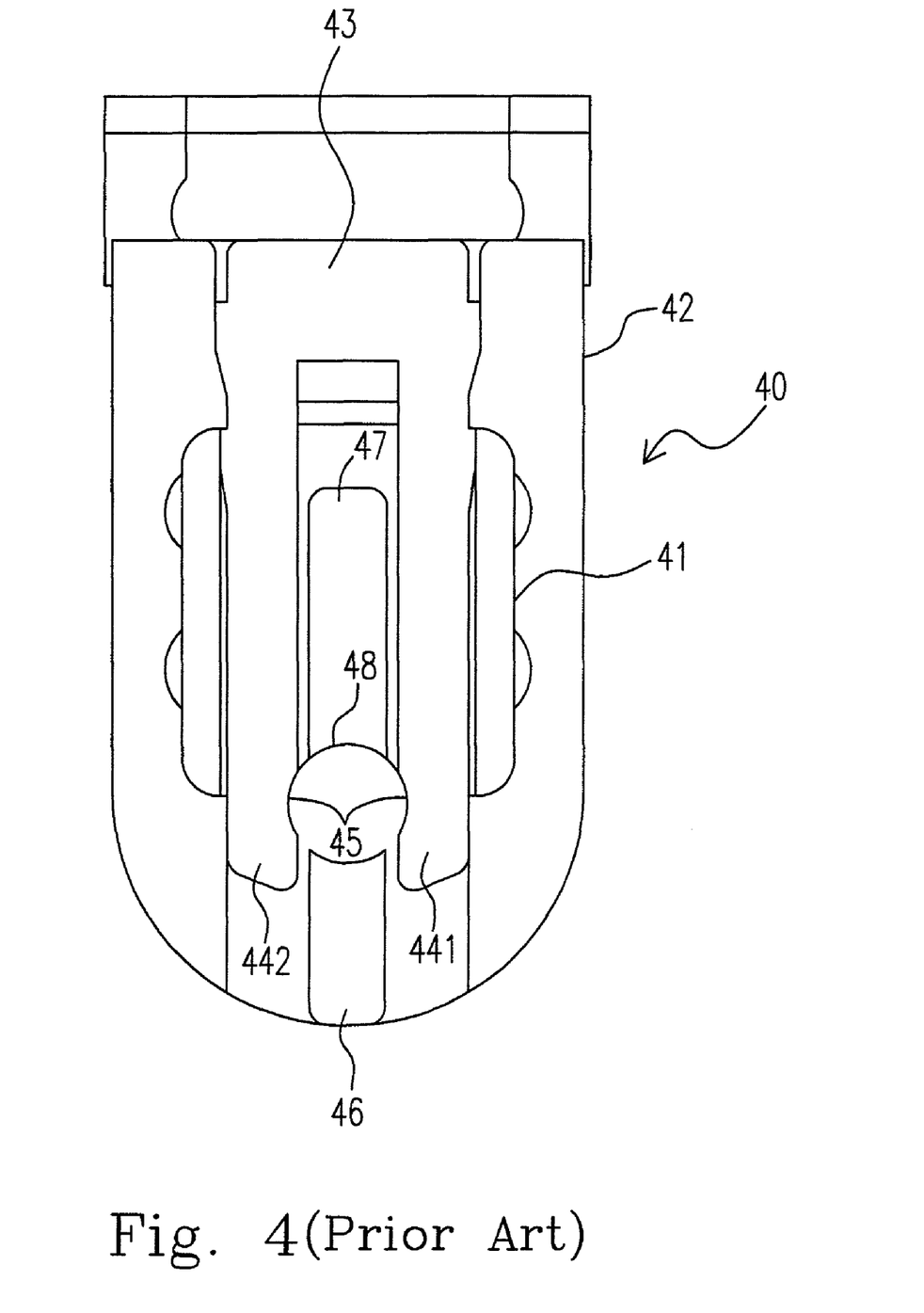
FIG. 4 is a cross-sectional view showing the fastening of another optical fiber mechanical splice in the prior art (U.S. Pat. No. 5,628,477).

Please refer to FIG. 4, which is the diagram in U.S. Pat. No. 5,638,477 entitled "STRAIN RELIEF MEANS FOR OPTICAL FIBER SPLICING MEMBER AND IMPROVED TOOL FOR MAKING THE SPLICE". In FIG. 4, a splice device 40 is shown, wherein the cable end of the jacket is contained in the cable receiving channel or opening 48, which is composed of four components: (1) an insert 41 disposed in the slot 42; (2) the opposed groove 45 of two parallel plates 441, 442 of a clip member 43; (3) a parallel slot 46 of the lower part of the base; and (4) a center wall 47. Further, the jacket fastening effect is obtained by upwardly and downwardly actuating the clip member 43. Since the structure disclosed in U.S. Pat. No. 5,638,477 is complicated and the jacket rather than the optical fiber is directly fastened, it also has the drawback of insufficient stability.

Figure 5:
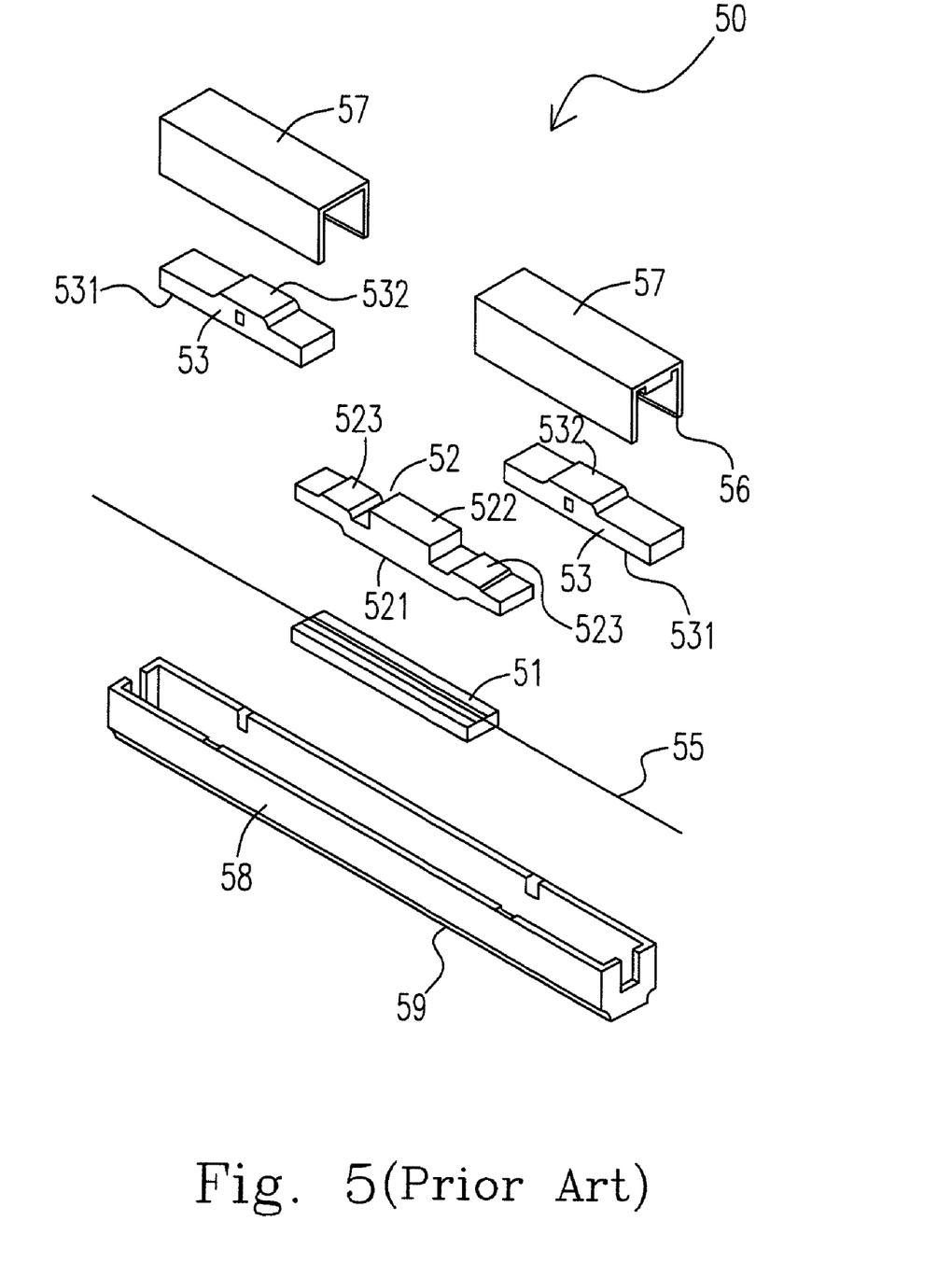
FIG. 5 is a three dimensional view showing components of another optical fiber mechanical splice in the prior art (U.S. Pat. No. 5,708,746).

Please refer to FIG. 5, which is the diagram in U.S. Pat. No. 5,708,746 entitled "RAIL-TYPE DEVICE FOR MECHANICALLY SPLICING OPTICAL FIBERS". In FIG. 5, a splice device 50 is shown, in which the optical fiber 55 is preliminarily engaged by a longitudinal base panel 51, a bottom center embossment 521 of a optical fiber clamp 52, and two bottoms 531 of a pair of jacket clamps 53. When a cover 57 with a pair of rails 56 slides along the rail grooves 59 of the longitudinal body 58 to a top center embossment 522 of the optical fiber clamp 53, the top embossment 532 of the coating clamp 53 and a pair of top side embossments 523 of the optical fiber clamp 52 are simultaneously engaged so as to fix the optical fiber 55. Since the structures disclosed in U.S. Pat. No. 5,708,746 are complicated and it is the optical fiber 34, rather than the jacket, of the optical fiber is engaged. Therefore, stability also might be insufficient.

Figure 6:
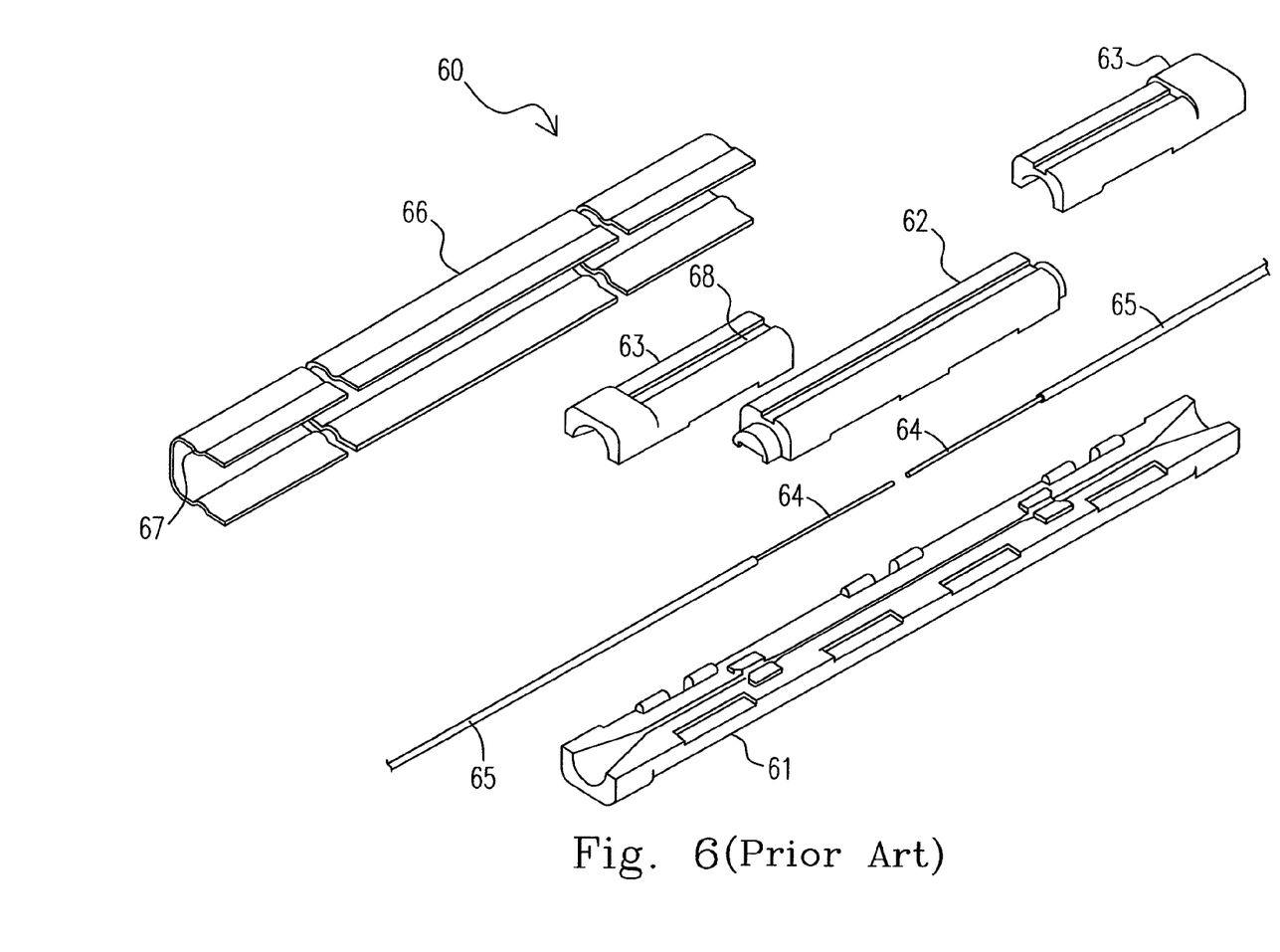
FIG. 6 is a three dimensional view showing components of another optical fiber mechanical splice in the prior art (U.S. Pat. No. 5,963,699).

Please refer to FIG. 6, which is the diagram in U.S. Pat. No. 5,963,699 entitled "OPTICAL FIBER MECHANICAL SPLICE". In FIG. 6, a splice device 60 is shown, which preliminarily engages two naked optical fibers 64 and two single jackets 65 by using the central lid 62 and two linearly configured terminal lids above the base member 61. Further, a positioning protrusion section 67 of a thin and long spring clamp 66 engages a corresponding depression section 68 of the central lid 62 and the terminal lids 63 and a corresponding depression section (not shown in FIG. 6) of the base member 61, so as to engage the base member 61, the central lid 62 and two terminal lids 63 and fasten the naked optical fibers 64 and the jackets 65. Since the naked optical fibers 64 and the jackets are fastened by merely taking advantage of the elastic property of the clamp 66, the drawback of elastic fatigue can hardly be avoided and the drawback that the optical fibers cannot be forcefully fastened after a long period of time due to the fatigue issue.

Therefore, the problem that the optical fiber fastening section and the jacket fastening section of the optical fiber splice cannot be connected tightly for a long period of time needs to be resolved. Regarding the above-mentioned deficiency, the inventor of the present invention endeavors in the experiments, tests and researches to obtain an optical fiber mechanical wedge splice, which not only resolves the drawback due to fatigue of the metal clamp, but also is convenient for fast fastening the optical fiber splice. It also renders that the issue to be resolved in the present invention is to overcome the problem that the base member and the lid cannot be fastened for a long time of use, the problem that the neighboring blocks cannot be easily wedged with each other to be fastened tightly due to the beveled surface of the first wedge, and the problem how to tightly fasten the optical fiber rather than the jackets.

It is therefore attempted by the applicant to deal with the above situation encountered in the prior art.

SUMMARY OF THE INVENTION

The present invention relates to a wedge-type mechanical splice of optical fiber, which comprises a housing, a V-grooved block, a pushing block, and a first wedge. The housing is a hollow block, and has two openings for guiding optical fiber at two opposite sides. The V-grooved block, so called a first block, is a long strip block having a V-shaped groove on its surface. The pushing block, so called a second block, confronts to the V-grooved block. The first wedge is a wedged-type block. The second block is moved toward the first block or the first block is moved toward the second block by pushing the first wedge, so that two optical fibers are aligned and secured in the V groove.

Preferably, either the first block or the second block has a slope to operate properly with the first wedge, and a shape of the housing is either a rectangular tube or a cylindrical tube to facilitate different types of installation of mechanical splice.

Preferably, the V-grooved block can includes two, four, six or eight V grooves in order to connect multi-fibers.

Certainly, each of the two openings of the housing has a pair of jacket-wedge and jacket-block so as to furthermore secure an optical fiber inside the housing by firmly gripping the jacket of fiber.

Certainly, three cylindrical rods are arranged in the V groove of the V-grooved block, and the optical fibers within the three rods are aligned indirectly and secured firmly by pressing down the first wedge to move the V-grooved block toward the pushing block.

Preferably, the housing includes a cover and a body to form the hollow block.

Preferably, the splice further includes a second wedge working together with the first wedge to exert pressure of the first block against the second block.

In accordance with another aspect of the present invention, a wedge splice is provided. The wedge splice includes: a casing having two terminals, each of which has an opening passing therethrough a optical fiber; a first block having a first surface; a first wedge; and a second block having a first surface and configured on the first wedge. One of the first surfaces has at least one groove configured thereon, and the second block is pushed toward the first block by the first wedge to align the two optical fibers in the at least one groove.

Preferably, the splice further includes a second wedge, wherein the second block is pushed toward the first block by both of the first wedge and the second wedge to align the two optical fibers in the at least one groove.

Preferably, the at least one groove has an even number of V-shaped grooves, the casing is a rectangular tube fabricated by a plate, and a component having a cross-section of a U-shape to form a sealed structure.

Preferably, the at least one groove further includes three rods configured therein, the three rods have an internal space thereamong, and the two optical fibers are contained and aligned in the internal space.

Preferably, the first wedge has a first beveled surface, the second block has a second beveled surface by which the second block is configured on the first beveled surface, and the first wedge is pushed to be lodged in the second block through the first and the second beveled surfaces.

By way of the above-mentioned illustration of the concept, it can be known that the wedge type mechanical optical fiber splice can align and fasten the two optical fibers tightly in the V-grooved block by using the first wedge to press the pushing block toward the V-grooved block and has a characteristic that the first block sets a bevel angle to accommodate with the first wedge. For the easier illustration, the present invention will become more readily apparent by the following preferred embodiments and the drawings.

DETAILED DESCRIPTION OF THE PREFERRED EMBODIMENT

Figure 7:
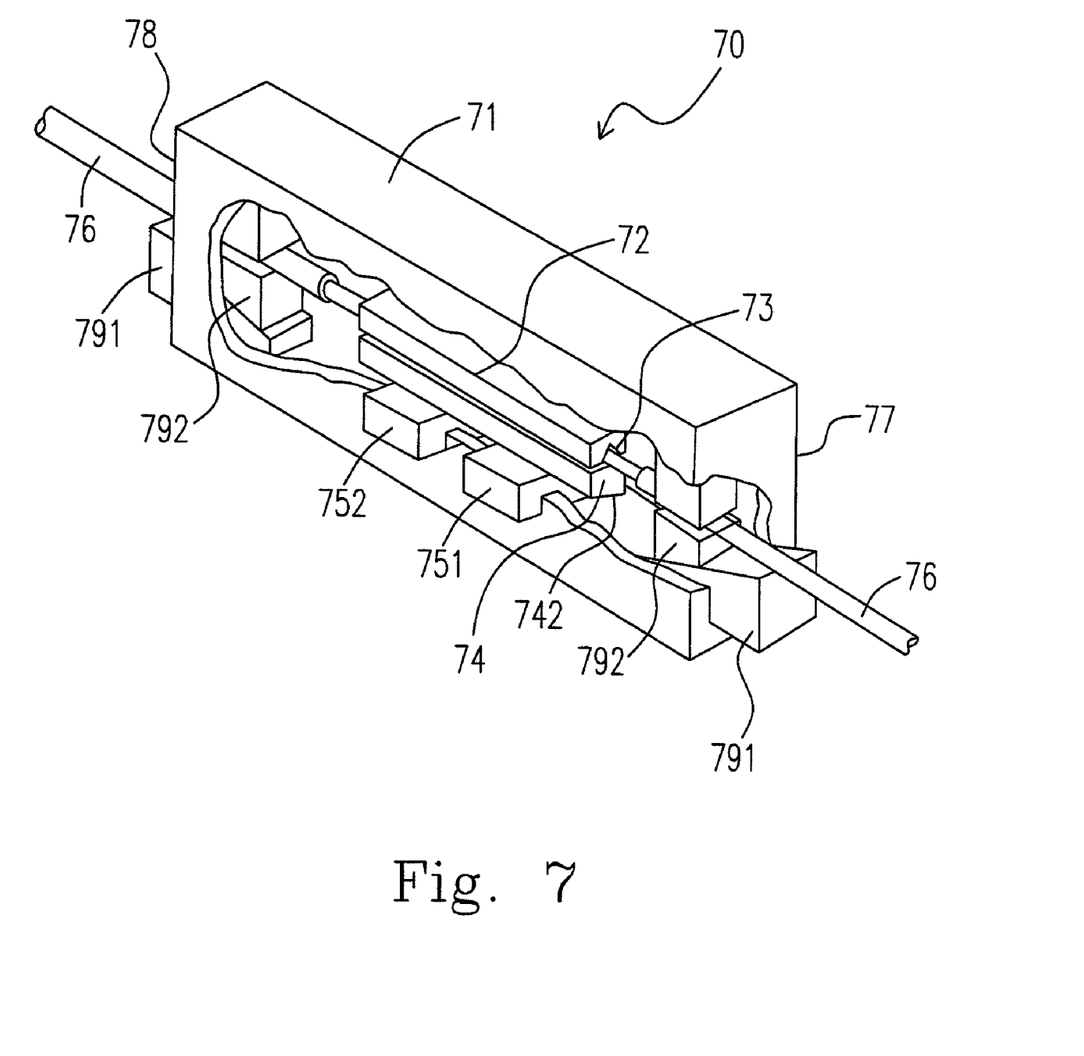
FIG. 7 is a schematic diagram showing an optical fiber mechanical wedge splice in accordance with a first preferred embodiment of the present invention.

Please refer to FIG. 7, which illustrates an wedge-type mechanical optical fiber splice 70, which includes a housing 71 which is a hollow block 71 having two openings for guiding optical fibers 76 at two opposite ends 77, 78; a V-grooved block 72 which is a first long strip block and one surface of the long strip block has a V groove 73; a pushing block 74, which is a second long strip block and preferably has a beveled surface or a slope 742, confronting to the V groove 73; and a first wedge 751 which is a block having an oblique angle. (A oblique angle is either a blunt angle or an acute angle, as defined in the field of Mathematics.) In other words, the first wedge 751 has a beveled surface or a slope (not shown) which is neither parallel nor perpendicular to the other surfaces of the first wedge 751, and the slope of the first wedge 751 fits with that of the pushing block 74.) Taking advantage of the mechanism of wedge, one may use the first wedge 751 to push the pushing block 74 toward the upper V-grooved block 72 by pushing the first wedge 751 along a direction perpendicular to the movement of the pushing block 74, and two optical fibers can be aligned and tightly fastened in the V-grooved block 72 so as to achieve the effect of high tensile strength and convenient alignment, which is one of the main characteristics of the present invention.

The splice 70 further includes a second wedge 752 which pushes the pushing block 74 cooperatively with the first wedge 751. Certainly, it is also applicable that, in the splice 70, only the first wedge 751 pushes the pushing block 74 by changing the position of the first wedge 751. In this practice, the second long strip block 74 in the splice 70 has a beveled surface or a slope 742 to fit with the first wedge 751. Preferably, the housing 71 of the splice 70 is either a rectangular tube or a cylindrical tube so as to facilitate different types of installation of mechanical splice. In the splice 70, a pair of jacket wedges 791 and jacket pushing blocks 792 also can be disposed in an input terminal 77 and an output terminal 78 of the housing 71 respectively. With the similar mechanism of wedge, one may push the jacket wedges 791 inward and makes the jacket pushing blocks 792 move upward to secure the jackets of the optical fibers 76.

Figure 8:
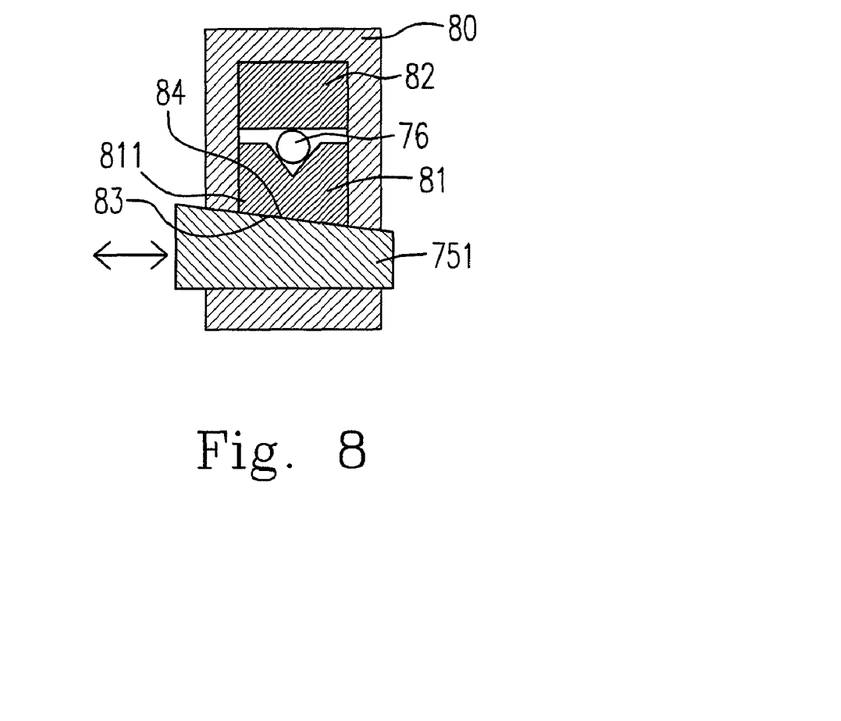
FIG. 8 is a cross-sectional view showing an optical fiber mechanical wedge splice in accordance with a second preferred embodiment of the present invention.
Figure 9:
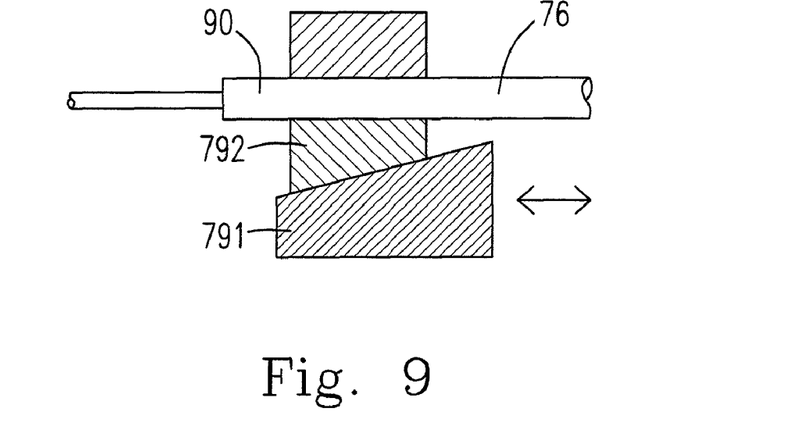
FIG. 9 is a cross-sectional view showing the jacket being pushed tightly by using the jacket wedge and the jacket pushing block in FIG. 7.

Please refer to FIG. 8, which schematically illustrates the structure of a splice 80 according to another embodiment of the present invention, wherein a lower V-grooved block 81, which is a first long strip block, is pushed toward an upper pushing block 82 a first wedge 751. In this embodiment, the first long strip block 81 in the splice 80 has a oblique angle 811 to fit with the first wedge 751. When the first wedge 751 is pushed from left to right, an upper beveled surface (slope) 83 of the first wedge 751 tightly matches a lower beveled surface (slope) 84 of the V-grooved block 81 and a force is transferred to the lower V-grooved block 81 via the beveled surfaces 83 and 84 to push the V-grooved block 81 upwards to fasten the optical fiber 76 located on the V-groove portion of the block 81. Please refer to FIG. 9, which schematically illustrates that a jacket portion 90 of the optical fiber 76 is fastened tightly by using the combination of a jacket wedge 791 and a jacket pushing block 792, so as to achieve the effect that two optical fibers 76 are tightly secured at the two terminals 77, 78 of the housing 71.

Figure 10:
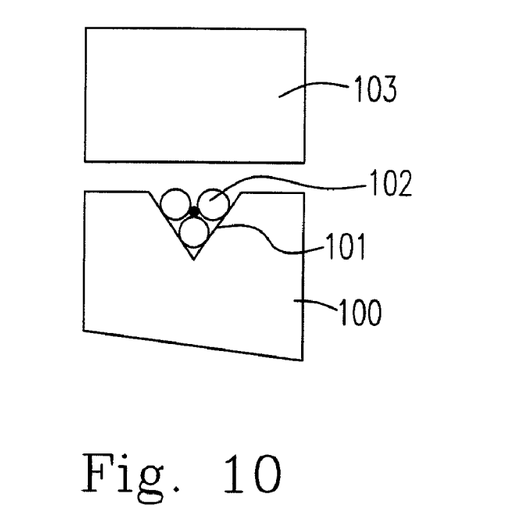
FIG. 10 is the cross-sectional view showing an optical fiber mechanical wedge splice in accordance with a third preferred embodiment of the present invention.

Please refer to FIG. 10, which schematically illustrates another application of a V-grooved block 100, which contains three rods 102, preferably cylindrical, in a V groove 101 of the V-grooved block 100, according to another embodiment of the present invention. Two optical fibers 76 surrounded by the three rods 102 on the V-grooved block 100 are indirectly aligned and fastened therewithin by using the first wedge 751 to push V-grooved block 100 toward a pushing block 103. The three rods 102 transfer the compression forces from the V-grooved block 100 and the pushing block 103 to the optical fibers 76 to tightly fasten the optical fibers 76.

Figure 11:
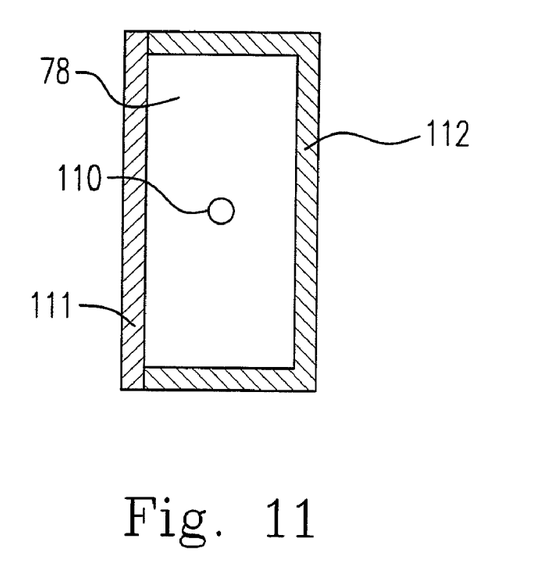
FIG. 11 is a cross-sectional view showing the housing in FIG. 7.

Please refer to FIG. 11, which schematically illustrates an optical fiber conducting opening 110 is disposed in one side 78 of the housing 71 (although the optical fiber conducting opening is not shown in the input terminal, there are optical fiber conducting openings disposed in the opposite sides 77 and 78). The housing of the splice 70 further includes a cover 111 and a body (having a U-shaped cross-section) 112 to form the hollow block. Regarding the fabrication process of the cover 111 and the body 112, for instance, they can be performed by ultrasonic thermal bonding or tenon-slot engagement. In addition, the V-grooved block 72 of the splice 70 may have 2, 4, 6 or 8 V grooves (not shown in the figure) so as to connect the other optical fibers having a plurality of cores, which is regarded as multi-fibers.

In conclusion, a novel model is provided in the present invention where two optical fibers can be aligned and fastened tightly in the V groove by using the first wedge to push the pushing block toward the V-grooved block. Further, a slope disposed in the first long strip block is utilized to achieve the purpose of accommodating with the oblique surface of the first wedge.

While the invention has been described in terms of what is presently considered to be the most practical and preferred Embodiments, it is to be understood that the invention needs not be limited to the disclosed Embodiments. On the contrary, it is intended to cover various modifications and similar arrangements included within the spirit and scope of the appended claims, which are to be accorded with the broadest interpretation so as to encompass all such modifications and similar structures.

What is claimed is:

1. A wedge-type mechanical splice of optical fiber, comprising:
    a housing being a hollow block having two openings for guiding optical fibers at two opposite sides of the housing, wherein the housing includes a cover and a body to form the hollow block;
    a V-grooved block, so called a first block, being a long strip block having a V-shaped groove on its surface;
    a pushing block, so called a second block, confronting to the V-grooved block; and
    a first wedge being a wedged-type block, wherein the second block is moved toward the first block or the first block is moved toward the second block by pushing the first wedge, so that two optical fibers are aligned and secured in the V groove.

2. The wedge-type mechanical splice according to claim 1, wherein either the first block or the second block has a slope to operate properly with the first wedge, and a shape of the housing is either a rectangular tube or a cylindrical tube to facilitate different types of installation of mechanical splice.

3. The wedge-type mechanical splice according to claim 1, wherein the V-grooved block comprises two, four, six or eight V grooves in order to connect multi-fibers.

4. The wedge-type mechanical splice according to claim 1, wherein each of the two openings of the housing has a pair of jacket-wedge and jacket-block so as to furthermore secure an optical fiber inside the housing by firmly gripping a jacket of the optical fiber.

5. The wedge-type mechanical splice according to claim 1, further comprising three rods having an internal space theream­ong and configured in the V-shaped groove, wherein the optical fibers are contained in the internal space and aligned indirectly and secured firmly by pressing down the first wedge to move the V-grooved block toward the pushing block.

6. The wedge-type mechanical splice according to claim 1 further comprising a second wedge working together with the first wedge to exert pressure of the first block against the second block.

* * * * *